United States Patent [19]

MacFarland

[11] 4,114,230

[45] Sep. 19, 1978

[54] DEFLATOR-INFLATOR ATTACHMENT

[75] Inventor: Charles H. MacFarland, Rocky River, Ohio

[73] Assignee: The Scott & Fetzer Company, Cleveland, Ohio

[21] Appl. No.: 752,399

[22] Filed: Dec. 20, 1976

[51] Int. Cl.[2] .............................................. A47L 5/14
[52] U.S. Cl. ...................................... 15/330; 15/405; 15/415 R; 137/223
[58] Field of Search ................. 15/330, 339, 405, 415, 15/331; 46/87, 88, 90; 137/223, 231; 141/311 R, 329; 239/589; 302/63

[56] References Cited

U.S. PATENT DOCUMENTS

| 209,860 | 11/1878 | Callahan | 239/589 |
|---|---|---|---|
| 566,554 | 8/1896 | Young et al. | 15/415 X |
| 1,207,480 | 12/1916 | Blake | 15/330 |
| 1,330,547 | 2/1920 | Mehlhaf | 15/405 X |
| 1,752,664 | 4/1930 | Forcier | 15/419 X |
| 2,568,039 | 9/1951 | Torrell | 15/405 X |
| 2,606,338 | 8/1952 | DeLorenzo | 15/396 X |
| 2,913,756 | 11/1959 | MacFarland | 15/400 X |

FOREIGN PATENT DOCUMENTS 17,752 of 1897 United Kingdom ..................... 141/331

Primary Examiner—Christopher K. Moore
Attorney, Agent, or Firm—McNenny, Pearne, Gordon, Gail, Dickinson & Schiller

[57] ABSTRACT

A nozzle attachment for use in combination with a vacuum cleaner to inflate or deflate air expandable articles, a portion of the nozzle having a relatively large diameter for coupling with the free end of a flexible hose, a relatively small extended tip portion insertable into bodies of inflation valves to mechanically open recessed check valve elements, and an intermediate cross sectional transition portion having at least one conical zone for sealing against the mouths of the inflation valve bodies. For inflation, the opposite end of the hose is connected to the fan outlet of the vacuum cleaner while for evacuation it is connected to the fan inlet.

8 Claims, 5 Drawing Figures

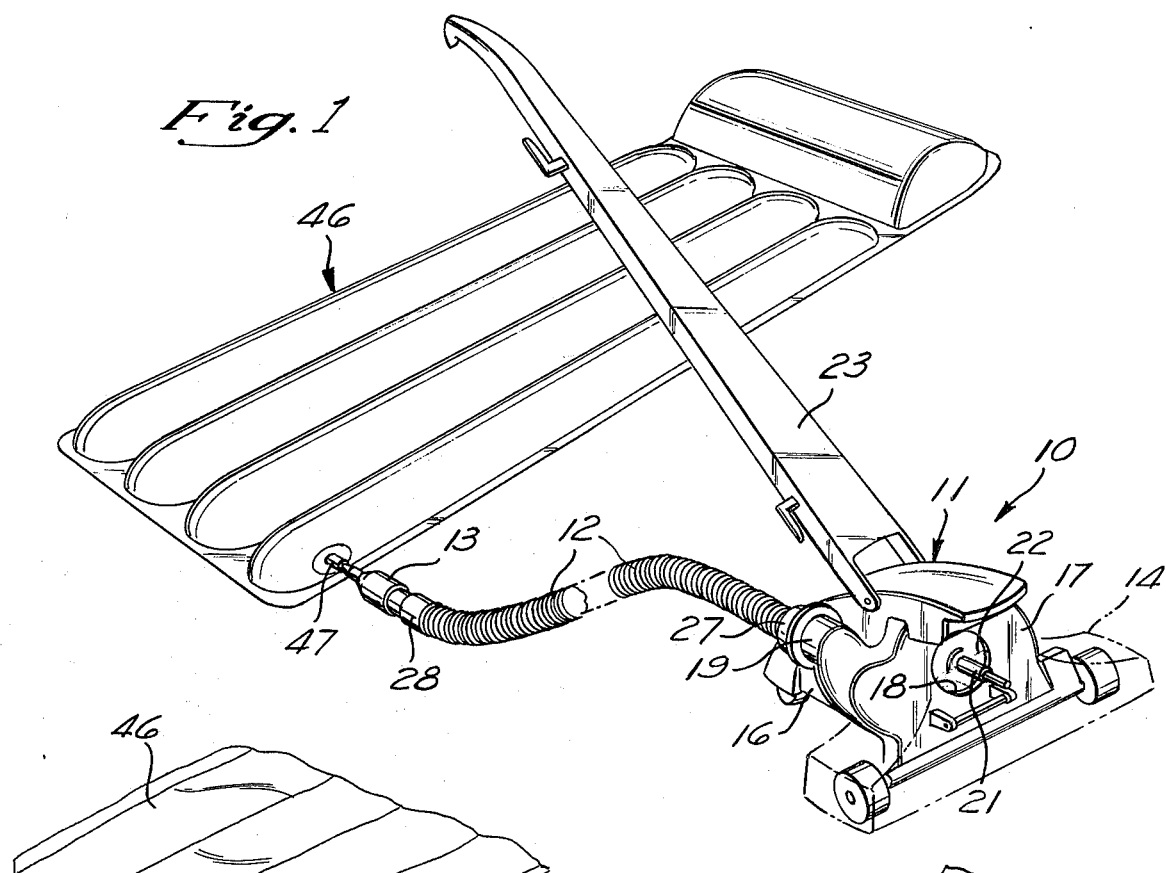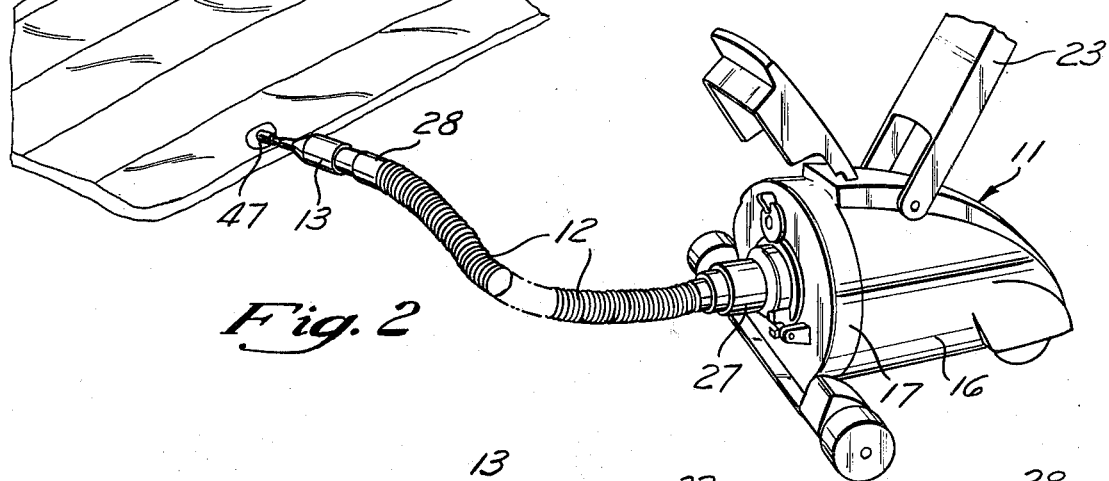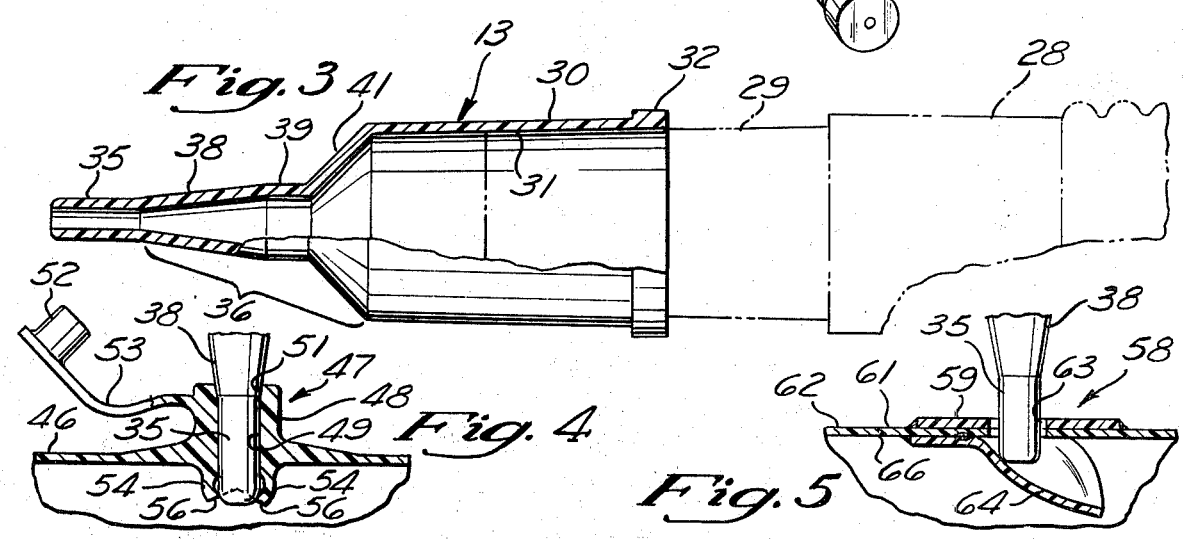

4,114,230

DEFLATOR-INFLATOR ATTACHMENT

BACKGROUND OF THE INVENTION

The invention relates to attachments for vacuum cleaners, and in particular to a nozzle attachment for a flexible air hose.

PRIOR ART

Air inflatable goods, such as air mattresses, swimming pool floats, rubber rafts, and toys, are ordinarily provided with inflation valves or ports which vary in size, configuration, and other design considerations. These articles are generally arranged to be inflated by exhalation of a person using the inflation valve as a mouthpiece. The effort expended in this manner in inflating an article of even a moderate size is often fatiguing. Primary for reasons of economy, such articles are ordinarily packaged and sold without hand pumps or other mechanical means for their inflation. While generally all households have a vacuum cleaner available, their general utilization as a power source for inflating expandable goods appears to have been largely unrealized.

SUMMARY OF THE INVENTION

The invention provides a nozzle attachment for a vacuum cleaner which is adapted to both inflate and deflate air expandable objects. One end of the attachment is arranged to be coupled with a conventional flexible air hose, while the other end has a configuration which is compatible with a wide variety of inflation valves typically provided on air expandable goods. Alternate modes of inflation and deflation with the nozzle are achieved by connecting the air hose to either the air exhaust outlet or inlet of the cleaner, respectively.

As disclosed, the nozzle includes a cylindrical forward end portion adapted to extend into an inflation valve body and maintain internal valving elements in nonsealing relation, and thereby assure a high air flow rate into the inflatable body. The cylindrical portion is critically dimensioned to be insertable into a majority of commercially used inflation valves. The forwardmost tip of the end portion is ideally rounded to reduce the risk of accidental perforation of a wall of an inflatable article or damage to its valving elements. The extended length of the cylindrical nozzle and portion is effective to hold recessed valving elements in an open position while the article is deflated by applying a suction through the nozzle. A cross sectional transition area behind the cylindrical forward end portion includes a conical zone adapted to seal against the entrance of an inflation valve to substantially eliminate air leakage during inflation. This sealing action results in faster inflation and maximum pressure capacity.

Use of the disclosed nozzle for deflating objects saves substantial time and eliminates the need for manually pressing out air bubbles which otherwise occur when an article is manually squeezed to expedite its deflation.

BRIEF DESCRIPTION OF THE DRAWING

FIG. 1 is a perspective view illustrating a nozzle attachment of the invention, with a hose assembled for inflation on a vacuum cleaner power plant;

FIG. 2 is a perspective view illustrating the nozzle attachment and hose assembled for deflation on the power plant;

FIG. 3 is a side view, partially in section, of the nozzle attachment;

FIG. 4 illustrates the use of the nozzle attachment in one type of inflation valve; and FIG. 5 illustrates the use of the nozzle attachment with another type of inflation valve.

DESCRIPTION OF THE PREFERRED EMBODIMENT

Referring now to the drawing, there is illustrated an assembly of an upright vacuum cleaner 10 including a power plant 11, a flexible air hose 12, and a nozzle attachment 13. The illustrated vacuum cleaner 10 is of a known type used for residential cleaning and the like and having a removable rug nozzle illustrated for reference in phantom at 14 in FIG. 1.

The power plant 11 includes a motor generally indicated at 16, a fan housing 17 having an inlet 18 at a front face and an outlet 19 at one side. The motor 16 includes a power shaft 21 extending through the housing 17 and directly driving a centrifugal fan 22 supported thereon within the housing. A handle 23 is pivotally mounted on the upper side of the power plant 11 for pushing and steering of the cleaner 10 in the normal manner.

The flexible air hose 12 has one end fitted with a coupler 27 arranged to be releasably secured in substantially airtight relation to the inlet 18 or outlet 19 of the fan housing 17. U.S. Pat. No. 3,279,828, issued in my name, discloses a preferred form of the coupler 27. The hose 12 is formed of a flexible material, preferably an elastomeric material with or without reinforcement. The other end of the hose 12 is terminated with a rigid tubular fitting 28 of circular cross section. The fitting 28, shown in phantom in FIG. 3, is formed of plastic or other suitable material, and includes a slightly tapered exterior surface 29.

The nozzle attachment 13 constructed in accordance with the invention is preferably molded or otherwise formed of a rigid plastic, such as polyethylene or polypropylene or other suitable rigid material. The tubular nozzle attachment 13 is generally of circular cross section and uniform wall thickness along its full length, and includes at a rearward end a relatively large hose coupling portion 30. This coupling portion 30 has an internal conical bore 31 complementary to the surface 29 of the hose end fitting 28 such that a friction lock is developed when the nozzle is slipped over the fitting. In a preferred example of a nozzle attachment 13, the taper angle of the bore 31 is 1 degree, 13 minutes. At a rearward edge of the hose coupling portion 30 is provided a circumferential rib or flange 32 which serves to stiffen the adjacent wall area and facilitate manual gripping of the nozzle 13 for assembly and disassembly from the hose fitting 28.

At an opposite end of the nozzle 13 there is provided a generally cylindrical, forward tip portion 35 of relatively small diameter, e.g., having a nominal outside diameter approximately between one-fifth to one-sixth of the nominal inside diameter of the hose coupling portion 30. The forwardmost end of the tip portion 35 is rounded to reduce the risk of puncturing thin-walled, inflatable objects and their associated parts. Intermediate the forward tip portion 35 and hose coupling 30 is a cross section transition portion 36, in the illustrated embodiment having a plurality of distinct zones of varying outside diameter. A moderately tapered zone or first frustum section 38 is provided immediately adjacent the tip portion 35 with a minor outside diameter substantially equal to the outside diameter of the tip portion. A relatively short, generally cylindrical zone 39 extends between this moderately tapered zone 38 and a flared wall zone or second frustum section 41. In the illustrated embodiment, the flared wall zone is defined by an angle of 45° from the longitudinal central axis of the nozzle 13.

By way of a specific example, and for purposes of distinguishing the nozzle 13 of the invention, one suitable form of the disclosed nozzle has the following characteristics:

| Forward tip portion (35) | |
|---|---|
| Outside diameter (nominal) | .225 in. |
| Inside diameter | .12 in. |
| Length | .60 in. |
| Moderately tapered zone (38) | |
| Major outside diameter | .443 in. |
| Length | .81 in. |
| Short cylindrical zone (39) | |
| Length | .25 in. |
| Flared wall zone (41) | |
| Minor diameter | .468 in. |
| Hose coupling portion (30) | |
| Major inside diameter (nominal) | 1.290 in. |
| Major outside diameter at rib (32) | 1.47 in. |
| Length | 2.00 in. |
| Typical wall thickness | .05 in. |

The nozzle attachment 13 is adapted to inflate air-expandable articles such as an inflatable air mattress 46, illustrated in FIGS. 1 and 2. The disclosed nozzle structure 13 is adapted to be efficiently used with a wide variety of inflation valves, such as provided on various inflatable or air-expandable objects. One type of inflation valve 47 suitable for the article 46 is illustrated in FIG. 4. The valve 47 comprises a cylindrical, relatively rigid, tubular body, usually of elastomeric material, having a central bore 49, including a mouth 51 at its outer end. The body 48 includes an integrally molded cap 52 attached to the body by a living hinge 53. The cap 52 is adapted to be pressed into the mouth 51 to afford an airtight closure of the valve 47. Integrally molded at the base of the body 48 are a pair of flexible lips 54 forming a check valve closing off the bore 49 when they are in a free configuration and their opposed edges 56 are in abutting contact.

With the nozzle 13 pushed tightly onto the hose end fitting 29 to develop a sufficient friction-retaining force, the nozzle tip portion 35 is inserted into the body bore 49 until the tapered nozzle zone 38 sealingly engages the mouth 51 of the body 48. With the opposite end 27 of the hose 12 coupled to the fan outlet 19, the power plant 11 forces pressurized air into the article 46. Substantially no air from the power plant 11 is lost at the inflation valve 47, owing to the engagement between the tapered nozzle zone 38 and the valve mouth 51. It will be appreciated that variations in the size of valve openings of the valve type illustrated in FIG. 4 are accommodated by the increasing diameter of the tapered zone 38. It will further be understood that valves having substantially larger openings than that illustrated in FIG. 4 are readily sealed by engagement with the relatively larger flared wall zone 41.

Inflatable objects such as the air mattress 46 are deflated with the nozzle 13 by changing the position of the opposite hose end 27 to the inlet position, as shown in FIG. 2. The article 46 is rapidly deflated by the vacuum developed by the power plant 11 and drawn through the nozzle 13 and hose 12. Use of the nozzle 13 thereby greatly reduces the time required to deflate the article 46 and eliminates the need to press out localized pockets of air.

FIG. 5 illustrates a second kind of inflation valve 58, which is constructed by welding with solvent or heat a washer-like reinforcement 59 to the exterior surface 61 of a wall 62 of an inflatable article in registration with a hole 63 in the wall. A flapper or diaphragm 64 is likewise welded to an interior surface 66 of the wall 62 underlying the hole 63. Less than the full perimeter of the flapper 64 is secured to the interior surface 56 so that a portion of the flapper is free to be displaced from the area of the hole 63 to permit passage of air therethrough. Where the flapper 64 permits, the tip portion 35 of the nozzle 13 may be fully inserted into the hole 63 to effect a seal by either the tapered zone 38 or flared wall zone 41. Otherwise, where the flapper 64 is not fully displaceable from the hole 63, a person can form an adequate seal around the nozzle tip 35 and hole with his fingers. An article having a valve of the type of FIG. 5 is readily evacuated or deflated, as before described, by connecting the hose to the power plant inlet 18. As suggested in FIG. 5, the tip 35 is utilized to maintain the flapper 64 in an open position away from sealing engagement with the interior surface 66. Air is exhausted both into the nozzle tip 35 and around the nozzle tip.

The invention is not restricted to the slavish imitation of each and every detail set forth above. Obviously, devices may be provided which change, eliminate or add certain specific details without departing from the scope of the invention.

What is claimed is:

1. An assembly for inflating and deflating objects comprising a residential type vacuum cleaner power plant, including a motor, a housing having an air inlet and an air outlet, a fan in the housing driven by the motor, a flexible air hose, coupling means on one end of the hose to alternately connect the hose to the air outlet or the air inlet, the other end of the hose having a substantially circular cross section, a nozzle adapted to be releasably connected to the circular other end of the hose, said nozzle having a hose end engaging portion of a diameter generally equal to the diameter of the other hose end, a forward end of said nozzle including a circular tip portion of a diameter substantially reduced from the diameter of the hose engaging portion, said nozzle having a transition portion intermediate said hose engaging portion and said tip portion, said transition portion including first and second frustum sections, said first frustum section being adjacent said circular tip portion and flaring radially outwardly in a direction away from said circular tip portion at a relatively shallow angle, said second frustum section being adjacent said hose engaging portion and flaring radially outwardly in a direction away from said first frustum section at a rate substantially greater than the rate of flare of said first frustum secton, said first frustum section of said transition portion being adapted to seal the mouth of an inflation valve when said circular tip portion is fully inserted within the body of the inflation valve, said second frustum section of said transition portion being adapted to seal the mouth of an inflation valve relatively larger than said first mentioned inflation valve when said circular tip portion and said first frustum section are fully inserted within the body of said relatively larger inflation valve.

2. An assembly as set forth in claim 1 wherein said tip portion has a substantially cylindrical exterior surface generally along its full length, said first frustum section having a minor external diameter substantially equal to the outside diameter of said tip portion, said tip portion and first frustum section being integral with one another.

3. An assembly as set forth in claim 2, wherein said hose end engaging portion of said nozzle is arranged to be releasably connected with said other hose end by a friction fit.

4. An assembly as set forth in claim 3, wherein said hose end engaging portion of said nozzle is arranged to engage the exterior surface of said other hose end with sufficient frictional force to retain said nozzle on said other hose end against pressure forces developed by said power plant tending to separate said nozzle from said other hose end.

5. An assembly as set forth in claim 4, wherein said other hose end has a tapered exterior and said hose end engaging portion has an interior base complementary to said tapered exterior.

6. An assembly as set forth in claim 1, wherein said nozzle is sufficiently rigid to permit it to be connected to said inlet through said hose, whereby a vacuum may be drawn through said nozzle to deflate objects.

7. A nozzle attachment for a residential type vacuum cleaner having a generally circular cross section and a generally uniform wall thickness along its full length, a rearward portion of the nozzle being of a predetermined size whereby it is adapted to be coupled with a conventional end fitting of a flexible hose, the rearward portion having an interior bore adapted to be releasably connected to the exterior of the hose end fitting, a forward extended end portion of the nozzle having a relatively small nominal outside diameter in the order of approximately one-sixth to one-fifth the nominal size of the interior bore of the rearward coupling portion, the length of said forward end portion being at least as long as twice its nominal outside diameter, and a transition portion intermediate said rearward coupling portion and said forward end portion, said transition portion including a first frustum section adapted to seal the mouth of an inflation valve when said forward end portion is fully inserted within the body of the inflation valve, said first frustum section increasing in diameter in a direction away from said forward end portion and being defined by a relatively shallow angle with reference to an axis of said forward end portion, said transition portion including a second frustum section adjacent said rearward portion adapted to seal the mouth of an inflation valve relatively larger than said first mentioned inflation valve when said forward end portion and said first frustum section are fully inserted within the body of such relatively large inflation valve, and said second frustum section being defined by a relatively large angle with reference to the axis of the forward end portion in comparison to the angle defining the first frustum section.

8. A nozzle attachment for a residential type vacuum cleaner having a generally circular cross section and a generally uniform wall thickness along its full length, a rearward portion of the nozzle being of a predetermined size whereby it is adapted to be coupled with a conventional end fitting of a flexible hose, the rearward portion having an interior bore adapted to be releasably connected to the exterior of the hose end fitting, a forward extended end portion of the nozzle having a relatively small nominal outside diameter in the order of approximately one-sixth to one-fifth the nominal size of the interior bore of the rearward coupling portion, the length of said forward end portion being at least as long as twice its nominal outside diameter, and a transition portion intermediate said rearward coupling portion and said forward end portion, said transition portion including a first frustum section adapted to seal the mouth of an inflation valve when said forward end portion is fully inserted within the body of the inflation valve, said first frustum section increasing in diameter in a direction away from said forward end portion and being defined by a relatively shallow angle with reference to an axis of said forward end portion, said transition portion including a second frustum section adjacent said rearward portion adapted to seal the mouth of an inflation valve relatively larger than said first mentioned inflation valve when said forward end portion and said first frustum section are fully inserted within the body of such relatively large inflation valve, and said second frustum section being defined by a relatively large angle with reference to the axis of the forward end portion in comparison to the angle defining the first frustum section, said interior bore having a relatively shallow taper angle whereby it is adapted to be releasably connected by a friction fit on the exterior of a hose end fitting having a complementary taper angle.

* * * * *